United States Patent
Han et al.

(10) Patent No.: US 11,492,516 B2
(45) Date of Patent: *Nov. 8, 2022

(54) ADHESIVE FILM AND DISPLAY MEMBER INCLUDING THE SAME

(71) Applicants: SAMSUNG SDI CO., LTD., Yongin-si (KR); SAMSUNG ELECTRONICS CO., LTD., Suwon-si (KR)

(72) Inventors: Jae Hyun Han, Uiwang-si (KR); Hyung Rang Moon, Uiwang-si (KR); Byeong Do Kwak, Uiwang-si (KR); Il Jin Kim, Uiwang-si (KR); Ji Ho Kim, Uiwang-si (KR); Sung Hyun Mun, Uiwang-si (KR); Gwang Hwan Lee, Uiwang-si (KR)

(73) Assignees: Samsung SDI Co., Ltd., Yongin-si (KR); Samsung Electronics Co., Ltd., Suwon-si (KR)

( * ) Notice: Subject to any disclaimer, the term of this patent is extended or adjusted under 35 U.S.C. 154(b) by 327 days.

This patent is subject to a terminal disclaimer.

(21) Appl. No.: 14/976,408

(22) Filed: Dec. 21, 2015

(65) Prior Publication Data

US 2016/0177147 A1    Jun. 23, 2016

(30) Foreign Application Priority Data

Dec. 23, 2014 (KR) .................. 10-2014-0187620
Dec. 14, 2015 (KR) .................. 10-2015-0178698

(51) Int. Cl.
| C09J 133/08 | (2006.01) |
| C09J 7/02 | (2006.01) |
| C09J 7/10 | (2018.01) |
| C09J 7/38 | (2018.01) |
| C08K 3/013 | (2018.01) |

(52) U.S. Cl.
CPC .............. *C09J 7/10* (2018.01); *C08K 3/013* (2018.01); *C09J 7/38* (2018.01); *C09J 133/08* (2013.01); *C09J 2301/312* (2020.08); *C09J 2301/408* (2020.08); *C09J 2301/414* (2020.08); *C09J 2433/00* (2013.01); *C09J 2467/006* (2013.01); *Y10T 428/25* (2015.01)

(58) Field of Classification Search
CPC ..... C09J 133/08; C09J 7/38; C09J 7/22; C09J 7/10; C09J 2205/102; C09J 2201/622; C09J 2483/00; C09J 2205/114; C09J 2467/006; C09J 2433/00; C08K 7/00

See application file for complete search history.

(56) References Cited

U.S. PATENT DOCUMENTS

| 2007/0149715 | A1* | 6/2007 | Lee ................... C09J 133/14 525/329.5 |
| 2009/0298969 | A1* | 12/2009 | Attarwala .......... C09J 133/20 523/201 |
| 2012/0100359 | A1* | 4/2012 | Kishioka ............ C09J 133/08 428/220 |
| 2015/0064460 | A1* | 3/2015 | Matsumoto ............ B32B 27/36 428/355 AC |
| 2016/0177146 | A1* | 6/2016 | Mun ................... C09J 133/08 428/220 |
| 2019/0264077 | A1* | 8/2019 | Park ...................... G02B 5/305 |

FOREIGN PATENT DOCUMENTS

| CN | 102753635 A | 10/2012 |
| CN | 102933677 A | 2/2013 |
| CN | 103160217 A | 6/2013 |
| CN | 103865411 A | 6/2014 |
| JP | 2006-301572 | 11/2006 |
| JP | 4750410 B2 | 8/2011 |
| KR | 10-2007-0055363 A | 5/2007 |
| KR | 10-2010-0002638 A | 1/2010 |
| KR | 10-2014-0085259 A | 7/2014 |
| KR | 10-2014-0102132 A | 8/2014 |
| TW | 2014-30085 A | 8/2014 |

OTHER PUBLICATIONS

Choi et al., KR 201000002638, Jan. 7, 2010 (Machine translation) (Year: 2010).*
Provisional double patenting rejection over claims of the above-identified application; USPTO Office action dated Sep. 27, 2017, in U.S. Appl. No. 14/973,312.
Korean Office Action dated May 4, 2016 in Corresponding Korean Patent Application No. 10-2015-0178698.
Korean Office Action dated Sep. 29, 2016 in Corresponding Korean Patent Application No. 10-2015-0178698.
Taiwanese Office Action dated Nov. 9, 2016.
Office Action dated Apr. 5, 2017 in the corresponding Chinese Patent Application No. 201510968865.1.

* cited by examiner

*Primary Examiner* — Cheng Yuan Huang
(74) *Attorney, Agent, or Firm* — Lee IP Law, P.C.

(57) ABSTRACT

An adhesive film is formed of an adhesive composition that includes a monomer mixture including a hydroxyl group-containing (meth)acrylate and a comonomer, and nanoparticles. The adhesive film has a glass transition temperature (Tg) of about −20° C. or less, an index of refraction of about 1.40 to about 1.55, and a haze of about 3% or less at a thickness of 100 μm.

12 Claims, 2 Drawing Sheets

(a)

(b)

ADHESIVE FILM AND DISPLAY MEMBER INCLUDING THE SAME

CROSS-REFERENCE TO RELATED APPLICATION

Korean Patent Application No. 10-2014-0187620, filed on Dec. 23, 2014, and Korean Patent Application No. 10-2015-0178698, filed on Dec. 14, 2015, in the Korean Intellectual Property Office, each entitled: "Adhesive Film and Display Member Including the Same," are incorporated by reference herein in their entirety.

BACKGROUND

1. Field

Embodiments relate to an adhesive film and a display member including the same.

2. Description of the Related Art

A transparent adhesive film is used as an adhesive film in interlayer bonding for stacking parts in an optical display or in attachment of a touchscreen of a mobile phone.

For example, a capacitive touch pad among optical displays may be attached to a window or film via an adhesive film. The capacitive touch pad may sense a change in capacitance of the window or film. An adhesive film in a touch pad may be stacked between a window glass and a TSP sensor glass.

SUMMARY

Embodiments are directed to an adhesive film formed from an adhesive composition. The adhesive composition includes a monomer mixture including a hydroxyl group-containing (meth)acrylate and a comonomer, and nanoparticles. The adhesive film has a glass transition temperature (Tg) of about −20° C. or less. an index of refraction of about 1.40 to about 1.55, and a haze of about 3% or less at a thickness of 100 μm.

The adhesive film may include a hydroxyl group-containing (meth)acrylic copolymer polymerized from the monomer mixture.

The hydroxyl group-containing (meth)acrylate may have a glass transition temperature (Tg) of about −80° C. to about −20° C.

The monomer mixture from which the hydroxyl group-containing (meth)acrylic copolymer is polymerized may include about 5 wt % to about 40 wt % of the hydroxyl group-containing (meth)acrylate and about 60 wt % to about 95 wt % of the comonomer.

The nanoparticles may have an average particle diameter of about 5 nm to about 400 nm.

A difference in an index of refraction between the nanoparticles and the hydroxyl group-containing (meth)acrylic copolymer may be about 0.05 or less.

The nanoparticles may be present in an amount of about 0.1 parts by weight to about 20 parts by weight based on 100 parts by weight of the monomer mixture.

The nanoparticles may be core-shell particles.

The core may include at least one of a polyalkyl (meth) acrylate and a polysiloxane. The shell may include a polyalkyl (meth)acrylate.

The adhesive composition may further include at least one of an initiator and a crosslinking agent.

The adhesive film may have a property such that at a thickness of 100 the adhesive film has a haze of about 3% or less, as measured after the adhesive film is subjected to 200% stretching.

The adhesive film may have a property such that at a thickness of 100 μm, the adhesive film has a haze of about 1% or less, as measured after the adhesive film is subjected to 200% stretching.

The adhesive film may have an average slope of about −5 to about 0, as measured in the range of −20° C. to 80° C. in a graph depicting a temperature-dependent storage modulus distribution of the adhesive film where an x-axis represents temperature (° C.) and a y-axis represents storage modulus (kPa).

The adhesive film may have a storage modulus at 80° C. of about 10 kPa to about 200 kPa.

The adhesive film may have a T-peel strength with respect to a corona-treated polyethylene terephthalate (PET) film of about 400 gf/in to about 4,000 gf/in, as measured at 25° C.

The adhesive film may have a T-peel strength with respect to a corona-treated polyethylene terephthalate (PET) film of about 200 gf/in to about 3,000 gf/in, as measured at 60° C.

The adhesive film may have a property such that at a thickness of 100 μm, the adhesive film has a recovery rate of about 30% to about 98%, as calculated by Equation 1:

$$\text{Recovery rate (\%)} = (1 - (X_f/X_0)) \times 100 \quad [\text{Equation 1}]$$

where $X_0$ and $X_f$ are defined according to Method A described herein.

The adhesive film may have a bubble generation area of about 0%, wherein the bubble generation area is determined according to Method B described herein.

The adhesive film may have a thickness of about 10 μm to about 2 mm.

Embodiments are further directed to a display member including an optical film and the adhesive film as described herein, the adhesive film being attached to one or both surfaces of the optical film.

The optical film may include at least one of a touch panel, a window, a polarizing plate, a color filter, a retardation film, an elliptical polarizing film, a reflective polarizing film, an anti-reflective film, a compensation film, a brightness improving film, an alignment film, an optical diffusion film, a glass shatter-proof film, a surface protective film, an OLED device barrier layer, a plastic LCD substrate, an indium tin oxide (ITO)-containing film, a fluorinated tin oxide (FTO)-containing film, an aluminum-doped zinc oxide (AZO)-containing film, a carbon nanotube (CNT)-containing film, an Ag nanowire-containing film, and a graphene-containing film.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
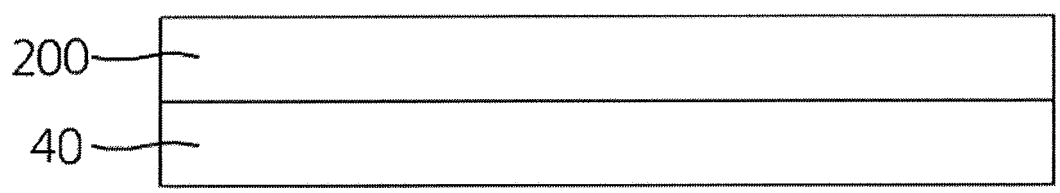
FIG. 1 illustrates a sectional view of a display member according to an embodiment.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration.

As used herein, the term "(meth)acrylate" may refer to acrylates and/or methacrylates.

As used herein, the term "copolymer" may refer to oligomers, polymers, or resins.

As used herein, the term "comonomer" refers to a monomer polymerized with a hydroxyl group-containing (meth)acrylate. The comonomer may be suitable monomer that is polymerizable with a hydroxyl group-containing (meth)acrylate.

As used herein, the term "glass transition temperature" of a monomer may refer to a glass transition temperature measured on a homopolymer of a measurement target monomer using DSC Discovery (TA Instrument Inc.). For example, a homopolymer of a measurement target monomer may be heated to about 180° C. at a rate of about 20° C./min, followed by slowly cooling the homopolymer to about −180° C., and then heating to about 100° C. at a rate of about 10° C./min, thereby obtaining data of an endothermic transition curve. An inflection point of the endothermic transition curve may be determined as the glass transition temperature.

As used herein, the term "average particle diameter" may refer to a z-average particle diameter of nanoparticles, as measured in a water-based or organic solvent using Zetasizer nano-ZS (Malvern Co., Ltd.).

As used herein, the term "core-shell structure" may refer to a general core-shell structure including a structure having several layers of cores or shells. The term "outermost layer" refers to the outermost layer among the several layers. The term "core-shell particles" refers to nanoparticles having a core-shell structure.

As used herein, the term "average slope" may refer to an average slope in the range of about −20° C. to about 80° C. in a graph depicting a temperature-dependent storage modulus distribution of the adhesive film where an x-axis represents temperature (° C.) and a y-axis represents storage modulus (kPa). The average slope may be calculated by Equation 2.

$$\text{Average slope} = (Mo(80°\text{ C.}) - Mo(-20°\text{ C.}))/(80-(-20)),\qquad\text{[Equation 2]}$$

In Equation 2, $Mo(80°\text{ C.})$ is a storage modulus at 80° C., and $Mo(-20°\text{ C.})$ is a storage modulus at −20° C.

Figure 2:
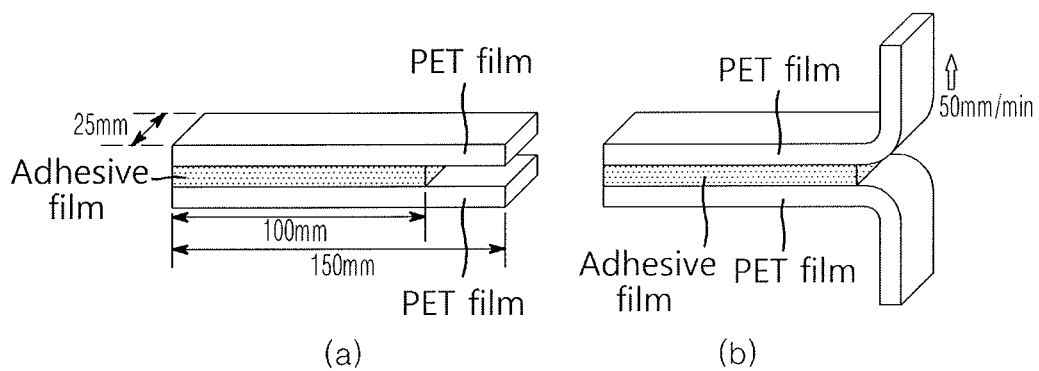
FIG. 2 illustrates a conceptual diagram of a measurement of T-peel strength.

As used herein, the term "T-peel strength" may refer to a value measured by the following procedures i) to v).

i) An adhesive composition is coated onto a polyethylene terephthalate (PET) release film, followed by UV irradiation at a dose of about 2,000 mJ/cm², thereby manufacturing an about 100 μm thick adhesive sheet of an adhesive film and the PET film.

ii) A PET film that has a size of about 150 mm×about 25 mm×about 75 μm (length×width×thickness) and is subjected to corona treatment twice (total dose: about 156) under corona discharge at a dose of about 78 using a corona treatment device, is prepared.

iii) An adhesive film sample having a size of about 100 mm×about 25 mm×about 100 μm (length×width×thickness) is obtained from the adhesive sheet, followed by laminating the corona-treated surfaces of the PET films to both surfaces of the adhesive film sample, thereby preparing a specimen, as shown in FIG. 2(a).

iv) The specimen is autoclaved under conditions of about 3.5 bar and about 50° C. for about 1,000 seconds and secured to a TA.XT_Plus texture analyzer (Stable Micro Systems Co., Ltd.).

v) In the TA.XT_Plus texture analyzer, the PET film at one side is kept fixed and the PET film at the other side is pulled at a rate of about 50 mm/min, thereby measuring T-peel strength (see FIG. 2(b)).

As used herein, the term "bubble generation area" may refer to a value (%) measured through the following Method B: An adhesive film (length×width×thickness: about 13 cm×about 3 cm×about 100 μm) including an about 50 μm thick PET film stacked on one surface thereof and an about 100 μm thick PET film stacked on the other surface thereof is bent towards the 50 μm thick PET film such that the length of the adhesive film is halved, and is then placed between parallel frames having a gap of about 1 cm. Next, the adhesive film is subjected to aging at about 70° C. and about 93% RH for about 24 hours, followed by analyzing an image that is obtained through an optical microscope (EX-51, Olympus Co., Ltd.), using Mac-View software (Mountech Co., Ltd.) to measure a ratio of area occupied by bubbles to area of the adhesive film.

Figure 3:
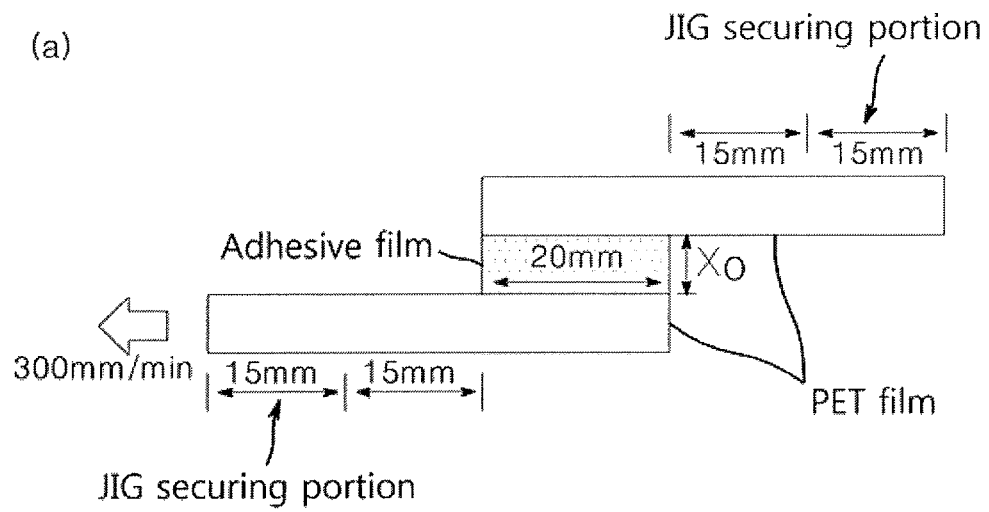
FIG. 3 illustrates sectional and plan views of measurement of a recovery rate.
Figure 3:
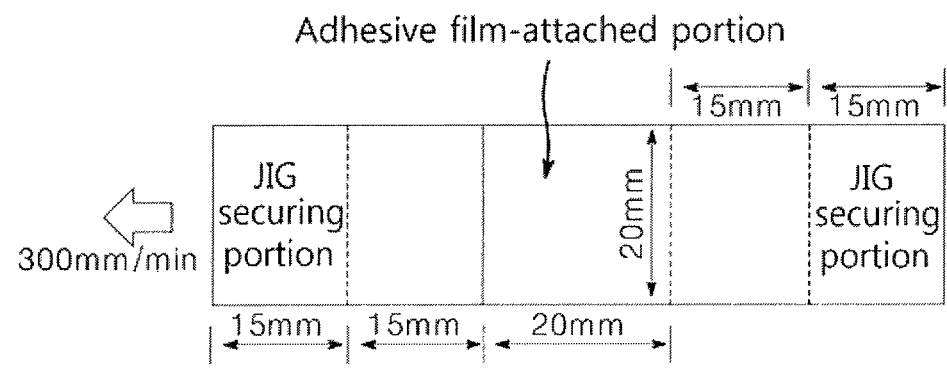

Herein, the "recovery rate" may be measured through the following Method A: When both ends of each polyethylene terephthalate (PET) film (thickness: about 75 μm) having a size of about 50 mm×about 20 mm (length×width) are defined as a first end and a second end, respectively, a specimen is prepared by bonding ends of two PET films to each other via an adhesive film having a size of about 20 mm×about 20 mm (length×width) in order of first end of first PET film/adhesive film/second end of second PET film, and has a contact area of about 20 mm×about 20 mm (length×width) between each of the PET films and the adhesive film (see FIGS. 3(a) and 3(b)). Referring to FIG. 3(a), jigs are secured to non-bonded ends of the PET films of the specimen at room temperature (25° C.), respectively. Next, the jig at one side is kept fixed, and the jig at the other side is pulled to a distance of about 1,000% of thickness (unit: μm) of the adhesive film (for example, to a distance of about 10 times an initial thickness ($X_0$) of the adhesive film) at a rate of about 300 mm/min and then maintained for about 10 seconds. Next, when an increased length of the adhesive film is defined as $X_f$ (unit: μm) when a force of about 0 kPa is applied to the adhesive film by recovering the adhesive film at the same rate (about 300 mm/min) as the pulling rate, the recovery rate (%) is calculated by Equation 1.

$$\text{Recovery rate (\%)} = (1 - (X_f/X_0)) \times 100 \qquad \text{[Equation 1]}$$

The initial thickness of the adhesive film may range from about 20 μm to about 300 μm. The recovery rate may be measured using a TA.XT_Plus texture analyzer (Stable Micro Systems Co., Ltd.). The recovery rate may be measured at 25° C. to 80° C.

According to an embodiment, an adhesive film may be formed of an adhesive composition that includes: a monomer mixture including a hydroxyl group-containing (meth)acrylate and a comonomer; and nanoparticles, wherein the adhesive film has a glass transition temperature (Tg) of about −20° C. or less, an index of refraction of about 1.40 to about 1.55, and a haze of about 3% or less at a thickness of 100 μm.

The adhesive film may have a glass transition temperature (Tg) of −20° C. or less, for example, about −150° C., −145°

C., −140° C., −135° C., −130° C., −125° C., −120° C., −115° C., −110° C., −105° C., −100° C., −95° C., −90° C., −85° C., −80° C., −75° C., −70° C., −65° C., −60° C., −55° C., −50° C., −45° C., −40° C., −35° C., −30° C., −25° C., or −20° C. The adhesive film may have a glass transition temperature (Tg) ranging from one of the numerical values set forth above to another one of the numerical values set forth above. For example, the adhesive film may have a glass transition temperature (Tg) of about −150° C. to about −20° C., or, for example, about −150° C. to about −30° C. Within these ranges, the adhesive film may exhibit excellent viscoelasticity at low temperature and room temperature.

The adhesive film may have an index of refraction of about 1.40, 1.41, 1.42, 1.43, 1.44, 1.45, 1.46, 1.47, 1.48, 1.49, 1.50, 1.51, 1.52, 1.53, 1.54, or 1.55. The adhesive film may have an index of refraction ranging from one of the numerical values set forth above to another one of the numerical values set forth above. For example, the adhesive film may have an index of refraction of about 1.40 to about 1.55, or, for example, about 1.42 to about 1.53, or, for example, about 1.43 to about 1.50. Within these ranges, the adhesive film may provide an improvement in transmittance due to a similar index of refraction thereof to an index of refraction of an optical sheet corresponding to an adherend. Such an adhesive film may reduce fatigue of eyes of a user when used for displays.

The adhesive film may have a property such that at a thickness of 100 μm, the adhesive film may have a haze of about 3% or less, or, for example, about 2% or less, or, for example, about 1% or less. Within these ranges, the adhesive film may exhibit excellent transparency when used for optical displays.

The adhesive film may be formed from an adhesive composition. Hereinafter, the adhesive composition will be described in detail.

Adhesive Composition

According to an embodiment, an adhesive composition may include: a monomer mixture including a hydroxyl group-containing (meth)acrylate and a comonomer; and nanoparticles.

Monomer Mixture

The monomer mixture may include the hydroxyl group-containing (meth)acrylate and the comonomer. The monomer mixture may be polymerized to form a hydroxyl group-containing (meth)acrylic copolymer. The adhesive film formed as a result may have a glass transition temperature (Tg) of about −20° C. or less, or, for example, about −150° C. to about −20° C., or, for example, about −150° C. to about −30° C. Within these ranges, the adhesive film may exhibit excellent viscoelasticity at low temperature and room temperature.

The hydroxyl group-containing (meth)acrylate may be a $C_1$ to $C_{20}$ alkyl group-containing (meth)acrylic acid ester having at least one hydroxyl group, a $C_5$ to $C_{20}$ cycloalkyl group-containing (meth)acrylic acid ester having at least one hydroxyl group, or a $C_6$ to $C_{20}$ aryl group-containing (meth)acrylic acid ester having at least one hydroxyl group.

For example, the hydroxyl group-containing (meth)acrylate may include at least one of 2-hydroxyethyl (meth)acrylate, 4-hydroxybutyl (meth)acrylate, 2-hydroxypropyl (meth)acrylate, 2-hydroxybutyl (meth)acrylate, and 6-hydroxyhexyl (meth)acrylate. For example, the hydroxyl group-containing (meth)acrylate may be a $C_1$ to $C_5$ alkyl group-containing (meth)acrylic monomer having a hydroxyl group, whereby the adhesive film can have further improved adhesion.

The hydroxyl group-containing (meth)acrylate may have a glass transition temperature (Tg) of about −80° C., −75° C., −70° C., −65° C., −60° C., −55° C., −50° C., −45° C., −40° C., −35° C., −30° C., −25° C., or −20° C. The hydroxyl group-containing (meth)acrylate may have a glass transition temperature (Tg) ranging from one of the numerical values set forth above to another one of the numerical values set forth above. For example, the hydroxyl group-containing (meth)acrylate may have a glass transition temperature (Tg) of about −80° C. to about −20° C. Within this range, the adhesive film may exhibit excellent viscoelasticity at low temperature and room temperature.

The hydroxyl group-containing (meth)acrylate may be present in an amount of about 5% by weight (wt %) to about 40 wt %, for example, about 10 wt % to about 30 wt % in the monomer mixture. Within these ranges, the adhesive film may exhibit excellent adhesion and reliability.

The comonomer may include at least one of an alkyl (meth)acrylate monomer, an ethylene oxide-containing monomer, a propylene oxide-containing monomer, an amine group-containing monomer, an amide group-containing monomer, an alkoxy group-containing monomer, a phosphoric acid group-containing monomer, a sulfonic acid group-containing monomer, a phenyl group-containing monomer, and a silane group-containing monomer, as examples.

The alkyl (meth)acrylate monomer may include an unsubstituted $C_1$ to $C_{20}$ linear or branched alkyl (meth)acrylic acid ester. For example, the alkyl (meth)acrylate monomer may include at least one of methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, heptyl (meth)acrylate, ethylhexyl (meth)acrylate, octyl (meth)acrylate, isooctyl (meth)acrylate, nonyl (meth)acrylate, decyl (meth)acrylate, lauryl (meth)acrylate, and isobornyl (meth)acrylate. The alkyl (meth)acrylate monomer may be a $C_4$ to $C_8$ alkyl (meth)acrylic monomer, such that the adhesive film may have further improved initial adhesion.

The ethylene oxide-containing monomer may include at least one ethylene oxide group (—$CH_2CH_2O$—)-containing (meth)acrylate monomer. For example, the ethylene oxide-containing monomer may include polyethylene oxide alkyl ether (meth)acrylates such as polyethylene oxide monomethyl ether (meth)acrylate, polyethylene oxide monoethyl ether (meth)acrylate, polyethylene oxide monopropyl ether (meth)acrylate, polyethylene oxide monobutyl ether (meth)acrylate, polyethylene oxide monopentyl ether (meth)acrylate, polyethylene oxide dimethyl ether (meth)acrylate, polyethylene oxide diethyl ether (meth)acrylate, polyethylene oxide monoisopropyl ether (meth)acrylate, polyethylene oxide monoisobutyl ether (meth)acrylate, or polyethylene oxide mono-tert-butyl ether (meth)acrylate, as examples.

The propylene oxide-containing monomer may include a polypropylene oxide alkyl ether (meth)acrylate such as polypropylene oxide monomethyl ether (meth)acrylate, polypropylene oxide monoethyl ether (meth)acrylate, polypropylene oxide monopropyl ether (meth)acrylate, polypropylene oxide monobutyl ether (meth)acrylate, polypropylene oxide monopentyl ether (meth)acrylate, polypropylene oxide dimethyl ether (meth)acrylate, polypropylene oxide diethyl ether (meth)acrylate, polypropylene oxide monoisopropyl ether (meth)acrylate, polypropylene oxide monoisobutyl ether (meth)acrylate, or polypropylene oxide mono-tert-butyl ether (meth)acrylate, as examples.

The amino group-containing monomer may include an amino group-containing (meth)acrylic monomer such as monomethylaminoethyl (meth)acrylate, monoethylaminoethyl (meth)acrylate, monomethylaminopropyl (meth)acrylate, monoethylaminopropyl (meth)acrylate, dimethylaminoethyl (meth)acrylate, diethylaminoethyl (meth)acrylate, N-tert-butylaminoethyl (meth)acrylate, or methacryloxyethyltrimethyl ammonium chloride (meth)acrylate, as examples.

The amide group-containing monomer may include an amide group-containing (meth)acrylic monomer such as (meth)acrylamide, N-methyl acrylamide, N-methyl methacrylamide, N-methylol (meth)acrylamide, N-methoxymethyl (meth)acrylamide, N,N-methylene bis(meth)acrylamide, and 2-hydroxyethyl acrylamide, as examples.

The alkoxy group-containing monomer may include 2-methoxyethyl (meth)acrylate, 2-methoxypropyl (meth)acrylate, 2-ethoxypropyl (meth)acrylate, 2-butoxypropyl (meth)acrylate, 2-methoxypentyl (meth)acrylate, 2-ethoxypentyl (meth)acrylate, 2-butoxyhexyl (meth)acrylate, 3-methoxypentyl (meth)acrylate, 3-ethoxypentyl (meth)acrylate, or 3-butoxyhexyl (meth)acrylate, as examples.

The phosphoric acid group-containing monomer may include a phosphoric acid group-containing acrylic monomer such as 2-methacryloyloxyethyldiphenylphosphate (meth)acrylate, trimethacryloyloxyethylphosphate (meth)acrylate, or triacryloyloxyethylphosphate (meth)acrylate, as examples.

The sulfonic acid group-containing monomer may include a sulfonic acid group-containing acrylic monomer such as sodium sulfopropyl (meth)acrylate, sodium 2-sulfoethyl (meth)acrylate, or sodium 2-acrylamido-2-methylpropane sulfonate, as examples.

The phenyl group-containing monomer may include a phenyl group-containing acrylic vinyl monomer such as p-tert-butylphenyl (meth)acrylate or o-biphenyl (meth)acrylate, as examples.

The silane group-containing monomer may include a silane group-containing vinyl monomer such as vinyltrimethoxysilane, vinyltriethoxysilane, vinyl tris(13-methoxyethyl)silane, vinyltriacetylsilane, and methacryloyloxypropyltrimethoxysilane, as examples.

The comonomer may be present in an amount of about 60 wt % to about 95 wt %, for example, about 70 wt % to about 90 wt % in the monomer mixture. Within these ranges, the adhesive film may exhibit excellent adhesion and reliability.

In another embodiment, the comonomer may have a glass transition temperature (Tg) of about −150° C. to about −20° C. The glass transition temperature may be measured, for example, with respect to a homopolymer of each measurement target monomer using a Discovery Q20 calorimeter (TA Instrument Inc.). For example, a homopolymer of each monomer may be heated to about 180° C. at a rate of about 20° C./min, followed by slowly cooling the homopolymer to about −180° C., and then heating to about 100° C. at a rate of about 10° C./min, thereby obtaining data of an endothermic transition curve. An inflection point of the endothermic transition curve may be determined as the glass transition temperature. The comonomer having a glass transition temperature (Tg) of about −150° C. to about −20° C. may be a suitable comonomer having the glass transition temperature (Tg) of about −150° C. to about −20° C. For example, the comonomer may be a monomer having a glass transition temperature (Tg) of about −150° C. to about −30° C., or, for example, a monomer having a glass transition temperature (Tg) of about −150° C. to about −40° C.

In an implementation, the comonomer may include at least one of an alkyl (meth)acrylate monomer, an ethylene oxide-containing monomer, a propylene oxide-containing monomer, an amine group-containing monomer, an amide group-containing monomer, an alkoxy group-containing monomer, a phosphoric acid group-containing monomer, a sulfonic acid group-containing monomer, a phenyl group-containing monomer, and a silane group-containing monomer that have a glass transition temperature (Tg) of about −150° C. to about −20° C.

For example, the comonomer may include at least one of an alkyl (meth)acrylate monomer including methyl acrylate, ethyl acrylate, n-butyl acrylate, iso-butyl acrylate, hexyl acrylate, heptyl (meth)acrylate, 2-ethylhexyl acrylate, dodecyl (meth)acrylate, or the like; an alkylene oxide group-containing (meth)acrylate monomer including polyethylene oxide monomethyl ether (meth)acrylate, polyethylene oxide monoethyl ether (meth)acrylate, polyethylene oxide monopropyl ether (meth)acrylate, polyethylene oxide monobutyl ether (meth)acrylate, polyethylene oxide monopentyl ether (meth)acrylate, polypropylene oxide monomethyl ether (meth)acrylate, polypropylene oxide monoethyl ether (meth)acrylate, polypropylene oxide monopropyl ether (meth)acrylate, or the like; an amino group-containing (meth)acrylate monomer including monomethylaminoethyl (meth)acrylate, monoethylaminoethyl (meth)acrylate, monomethylaminopropyl (meth)acrylate, monoethylaminopropyl (meth)acrylate, or the like; an alkoxy group-containing (meth)acrylate monomer including 2-methoxyethyl (meth)acrylate, 2-methoxypropyl (meth)acrylate, 2-ethoxypropyl (meth)acrylate or the like; and a silane group-containing (meth)acrylate monomer including vinyltrimethoxysilane, vinyltriethoxysilane, or the like.

In an implementation, the monomer mixture may include the hydroxyl group-containing (meth)acrylate and a monomer having a glass transition temperature (Tg) of about −150° C. to about −20° C. The monomer having a glass transition temperature (Tg) of about −150° C. to about −20° C. may be present in an amount of about 60 wt % to about 95 wt %, for example, about 70 wt % to about 90 wt % in the monomer mixture. Within these ranges, the adhesive film may exhibit excellent adhesion and reliability. The hydroxyl group-containing (meth)acrylate may be present in an amount of about 5 wt % to about 40 wt %, for example, about 10 wt % to about 30 wt % in the monomer mixture. Within these ranges, the adhesive film may have low haze and excellent adhesion.

In an implementation, the monomer mixture may further include a carboxyl group-containing monomer.

The carboxyl group-containing monomer may be (meth)acrylic acid, 2-carboxyethyl (meth)acrylate, 3-carboxypropyl (meth)acrylate, 4-carboxybutyl (meth)acrylate, itaconic acid, crotonic acid, maleic acid, fumaric acid, or maleic anhydride, as examples.

For example, the carboxyl group-containing monomer may be present in an amount of about 10 wt % or less, or, for example, about 3 wt % or less, or, for example, about 1 wt % or less in the monomer mixture. Within these ranges, the adhesive film may exhibit excellent adhesion and reliability.

Nanoparticles

The adhesive composition or the adhesive film may include the nanoparticles such that the adhesive film may exhibit excellent low temperature and/or room temperature viscoelasticity and may have a stable high temperature viscoelasticity due to a crosslinked structure thereof. In an implementation, the nanoparticles may form a chemical bond to the hydroxyl group-containing (meth)acrylic copolymer.

For example, although the adhesive composition or the adhesive film includes the nanoparticles, the adhesive composition or the adhesive film may have excellent transparency because of a specific average nanoparticle size described below and a specific difference in index of refraction between the nanoparticles and the hydroxyl group-containing (meth)acrylic copolymer.

The nanoparticles may have an average particle diameter of about 5 nm to about 400 nm, or, for example, about 10 nm to about 300 nm, or, for example, about 10 nm to about 200 nm. Within these ranges, agglomeration of the nanoparticles may be prevented and the adhesive film may exhibit excellent transparency.

A difference in index of refraction between the nanoparticles and the hydroxyl group-containing (meth)acrylic copolymer may be about 0.05 or less, and may range, for example, from about 0 to about 0.05, or, for example, from about 0 to about 0.03, or, for example, from about 0 to about 0.02. Within these ranges, the adhesive film may exhibit excellent transparency.

The nanoparticles may be core-shell particles having a core-shell structure. The core and the shell may have a glass transition temperature satisfying Equation 3:

$$Tg(c) < Tg(s) \quad \text{[Equation 3]}$$

where Tg (c) is a glass transition temperature (° C.) of the core and Tg (s) is a glass transition temperature (° C.) of the shell.

In an implementation, the core may have a glass transition temperature (Tg) of about −200° C. to about 10° C., or, for example about −200° C. to about −5° C., or, for example, about −200° C. to about −20° C. Within these ranges, the adhesive film may realize a desirable storage modulus at a low temperature (−20° C.) and may exhibit excellent low temperature and/or room temperature viscoelasticity.

The core may include at least one of a polyalkyl (meth) acrylate having a glass transition temperature (Tg) of about −150° C. to about 10° C. and a polysiloxane having a glass transition temperature (Tg) of about −200° C. to about −40° C.

For example, the polyalkyl (meth)acrylate having a glass transition temperature (Tg) of about −150° C. to about 10° C. may include a polyalkyl (meth)acrylate such as polymethyl acrylate, polyethyl acrylate, polypropyl acrylate, polybutyl acrylate, polyisopropyl acrylate, polyhexyl acrylate, polyhexyl methacrylate, polyethylhexyl acrylate, and polyethylhexyl methacrylate. For example, the polyalkyl (meth) acrylate having a glass transition temperature (Tg) of about −150° C. to about 10° C. may include at least one of polybutyl acrylate and polyethylhexyl acrylate.

For example, the polysiloxane having a glass transition temperature (Tg) of about −200° C. to about −40° C. may be an organosiloxane (co)polymer. The organosiloxane (co) polymer may be a non-crosslinked or crosslinked organosiloxane (co)polymer. The organosiloxane (co)polymer may be a crosslinked organosiloxane (co)polymer providing impact resistance and pigmenting properties. For example, the crosslinked organosiloxane (co)polymer may include crosslinked dimethylsiloxane, methylphenylsiloxane, diphenylsiloxane, or a mixture thereof. In the organosiloxane (co)polymer, two or more organosiloxanes may be copolymerized, whereby the nanoparticles may be adjusted to an index of refraction of about 1.41 to about 1.50.

A crosslinked state of the organosiloxane (co)polymer may be determined depending upon a degree of dissolution in various organic solvents. As the crosslinked state of the organosiloxane (co)polymer is intensified, the degree of dissolution thereof becomes lower. A solvent for determining a crosslinked state may include acetone, toluene, or the like. for example, the organosiloxane (co)polymer may have a moiety that is not dissolved in acetone or toluene. The organosiloxane copolymer may include about 30 wt % or more of insolubles in toluene.

In addition, the organosiloxane (co)polymer may further include an alkyl acrylate crosslinked polymer. The alkyl acrylate crosslinked polymer may include methyl acrylate, ethyl acrylate, n-butyl acrylate, 2-ethylhexyl acrylate, or the like. For example, the alkyl acrylate crosslinked polymer may be n-butyl acrylate or 2-ethylhexyl acrylate having a low glass transition temperature.

The shell may have a glass transition temperature (Tg) of about 15° C. to about 150° C., or, for example, about 35° C. to about 150° C., or, for example, about 50° C. to about 140° C. Within these ranges, the nanoparticles exhibit excellent dispersibility in a (meth)acrylic copolymer.

For example, the shell may include a polyalkyl (meth) acrylate having a glass transition temperature (Tg) of about 15° C. to about 150° C. For example, the shell may include at least one of polymethylmethacrylate (PMMA), polyethyl methacrylate, polypropyl methacrylate, polybutyl methacrylate, polyisopropyl methacrylate, polyisobutyl methacrylate, and polycyclohexyl methacrylate For example, the shell may include polymethylmethacrylate.

In another embodiment, the core or the shell may include two or more layers, and an outermost layer of the nanoparticles may include at least one a polyalkyl (meth)acrylate having a glass transition temperature (Tg) of about 15° C. to about 150° C.

The nanoparticles may be present in an amount of about 0.1 parts by weight to about 20 parts by weight, or, for example, about 0.1 parts by weight to about 15 parts by weight, or, for example, about 0.1 parts by weight to about 10 parts by weight based on 100 parts by weight of the monomer mixture. Within this range, the adhesive film may provide a balance between viscoelasticity, storage modulus and recovery rate.

In an implementation, the nanoparticles may be core-shell particles, and a weight ratio of the core to the shell of the nanoparticles may range from about 1:1 to about 9:1. Within this range, viscoelasticity of an adhesive film is maintained may be a wide temperature range, and the adhesive film may have an excellent recovery rate.

In an implementation, the adhesive composition may further include at least one of an initiator and a crosslinking agent.

Initiator

The initiator may include a radical photopolymerization initiator and a thermal polymerization initiator. The initiator may be an initiator that is the same as or different from an initiator used in the preparation of a prepolymer through partial polymerization.

The photopolymerization initiator may be a suitable initiator that provides a second crosslinking structure derived by polymerization of the radical polymerizable compound during curing through light irradiation. For example, the photopolymerization initiator may include benzoin, hydroxyl ketone, amino ketone, phosphine oxide photoinitiators, or the like. For example, the photopolymerization initiator may include benzoin, benzoin methyl ether, benzoin ethyl ether, benzoin isopropyl ether, benzoin n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl) ketone, benzophenone, p-phenylbenzophenone, 4,4'-bis(diethyl)aminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminobenzoic acid ester, oligo[2-hydroxy-2-methyl-1-[4-(1-methylvinyl)phenyl]propanone], or 2,4,6-trimethylbenzoyl-diphenyl-phosphine oxide. These photopolymerization initiators may be used alone or in combination thereof.

The thermal polymerization initiator may be a suitable initiator that provides a second crosslinking structure derived by polymerization of a polymerizable compound. For example, the thermal polymerization initiator may include initiators such as azo, peroxide and redox compounds. Examples of the azo compound may include 2,2-azobis(2-methylbutyronitrile), 2,2-azobis(isobutyronitrile), 2,2-azobis(2,4-dimethylvaleronitrile). 2,2-azobis-2-hydroxymethylpropionitrile, dimethyl-2,2-methylazobis(2-methylpropionate), and 2,2-azobis(4-methoxy-2,4-dimethylvaleronitrile). Examples of the peroxide compound may include: an inorganic peroxide such as potassium perchlorate, ammonium persulfate or hydrogen peroxide; or an organic peroxides such as diacyl peroxide, peroxydicarbonate, peroxyester, tetramethylbutyl peroxyneodecanoate, bis(4-butylcyclohexyl) peroxydicarbonate, di(2-ethylhexyl) peroxycarbonate, butyl peroxyneodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxy-3-methoxybutyl) peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethyl hydroxybutyl peroxyneodecanoate, amyl peroxyneodecanoate, t-butyl peroxy neoheptanoate, amyl peroxypivalate, t-butyl peroxypivalate, t-amyl peroxy-2-ethylhexanoate, lauroyl peroxide, dilauroyl peroxide, di(dodecanoyl) peroxide, benzoyl peroxide, or dibenzoyl peroxide. Examples of the redox compound may include mixtures of a peroxide compound and a reductant. These azo, peroxide, and redox compounds may be used alone or in combination thereof.

The initiator may be present in an amount of about 0.001 parts by weight to about 5 parts by weight, or, for example, about 0.003 parts by weight to about 3 parts by weight, or, for example, about 0.1 parts by weight to about 1 part by weight based on 100 parts by weight of the monomer mixture. Within this range, curing of the adhesive composition may be completely performed, deterioration in transmittance of the adhesive film due to the residual initiator may be prevented, bubble generation under severe conditions may be prevented, and the adhesive composition may have excellent reactivity.

Crosslinking Agent

The crosslinking agent may be a polyfunctional (meth)acrylate. Examples of the polyfunctional (meth)acrylate may include: a bifunctional acrylate such as 1,4-butanediol di(meth)acrylate, 1,6-hexanediol di(meth)acrylate, neopentylglycol di(meth)acrylate, polyethylene glycol di(meth)acrylate, neopentylglycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecane dimethanol di(meth)acrylate, dimethylol dicyclopentane di(meth)acrylate, ethylene oxide-modified hexahydrophthalic acid di(meth)acrylate, neopentylglycol-modified trimethylpropane di(meth)acrylate, adamantane di(meth)acrylate, 9,9-bis[4-(2-acryloyloxyethoxy)phenyl] fluorine, or the like; a trifunctional acrylates such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, a trifunctional urethane (meth)acrylate, tris(meth)acryloxyethylisocyanurate or the like; a tetrafunctional acrylate such as diglycerin tetra(meth)acrylate, pentaerythritol tetra(meth)acrylate, or the like; pentafunctional acrylates such as dipentaerythritol penta(meth)acrylate, or the like; a hexafunctional acrylates such as dipentaerythritol hexa(meth)acrylate, caprolactone-modified dipentaerythritol hexa(meth)acrylate, and a urethane (meth)acrylate (for example, a reaction product of an isocyanate monomer and trimethylolpropane tri(meth)acrylate). These crosslinking agents may be used alone or in combination thereof. For example, the crosslinking agent may be a polyfunctional (meth)acrylate of a polyhydric alcohol containing 2 to 20 hydroxyl groups to provide excellent durability to an adhesive film.

The crosslinking agent may be present in an amount of about 0.01 parts by weight to about 5 parts by weight, or, for example, about 0.03 parts by weight to about 3 parts by weight, or, for example, about 0.1 parts by weight to about 0.3 parts by weight based on 100 parts by weight of the monomer mixture. Within this range, the adhesive film may exhibit excellent adhesion and improved reliability.

In an implementation, the adhesive composition may further include a silane coupling agent.

Silane Coupling Agent

The silane coupling agent may include siloxane and epoxy silane coupling agents. The silane coupling agent may be present in an amount of about 0.01 parts by weight to about 5 parts by weight, or, for example, about 0.01 parts by weight to about 2 parts by weight, or, for example about 0.01 parts by weight to about 0.5 parts by weight based on 100 parts by weight of the monomer mixture. Within this range, the adhesive film may exhibit improved reliability.

Additives

The adhesive composition may further include an additive, such as a curing accelerator, an ionic liquid, a lithium salt, an inorganic filler, a softener, a molecular weight regulator, an antioxidant, an anti-aging agent, a stabilizer, an adhesion-imparting resin, a reforming resin (polyol, phenol, acrylic, polyester, polyolefin, epoxy, epoxidized polybutadiene resin, or the like), a leveling agent, a defoamer, a plasticizer, a dye, a pigment (a coloring pigments, extender pigment, or the like), a treating agent, a UV blocking agent, a fluorescent whitening agent, a dispersant, a heat stabilizer, a photostabilizer, a UV absorber, an antistatic agent, a coagulant, a lubricant, a solvent, or the like.

The adhesive composition may further include a non-curable compound. A solvent may be omitted from the adhesive composition. The adhesive composition may have a viscosity at 25° C. of about 300 cPs to about 50,000 cPs. When the adhesive composition does not include a solvent, the adhesive composition may exhibit an improvement in reliability by reducing bubble generation. Within this viscosity range, the adhesive composition may have excellent coatability and thickness uniformity.

Adhesive Film

According to an embodiment, the adhesive film may be formed of the adhesive composition as described above. The adhesive film may include a hydroxyl group-containing (meth)acrylic copolymer that is polymerized from a monomer mixture including a hydroxyl group-containing (meth)acrylate and a comonomer.

For example, the adhesive composition may be prepared by adding an initiator to the monomer mixture to prepare a syrup including a hydroxyl group-containing (meth)acrylic copolymer (prepolymer) through partial polymerization, followed by introducing nanoparticles, an initiator and/or a crosslinking agent to the syrup. In an implementation, an initiator may be added to a monomer mixture including a hydroxyl group-containing (meth)acrylate, a comonomer (for example, a comonomer having a glass transition temperature (Tg) of about −150° C. to about −20° C.) and nanoparticles, followed by performing partial polymerization, thereby preparing a syrup including a hydroxyl group-containing (meth)acrylic copolymer (prepolymer). An initiator and/or a crosslinking agent may then be mixed with the syrup, thereby preparing the adhesive composition.

The adhesive film may be manufactured by coating the adhesive composition, followed by UV curing.

The partially polymerized hydroxyl group-containing (meth)acrylic copolymer may have a weight average molecular weight of 500,000 g/mol to 3,000,000 g/mol, or, for example, 1,000,000 g/mol to 2,800,000 g/mol. Within these ranges, the adhesive film may exhibit improved durability.

In an implementation, the adhesive composition, which may prepared by mixing and partially polymerizing the monomer mixture forming the hydroxyl group-containing (meth)acrylic copolymer, the nanoparticles and a photopolymerization initiator, followed by adding an additional photopolymerization initiator and/or a crosslinking agent to the polymer, may be coated onto a release film, followed by curing, thereby manufacturing the adhesive film. Curing may be performed by irradiation at a wavelength of about 300 nm to about 400 nm at a dose of about 400 mJ/cm$^2$ to about 30,000 mJ/cm$^2$ under oxygen-free conditions using a low-pressure lamp. A coating thickness of the adhesive composition may range from about 10 μm to about 2 mm, or, for example, from about 20 μm to about 1.5 mm.

The adhesive film may be used as an OCA film, or may be formed on an optical film and thus used as an adhesive optical film. Examples of the optical film may include polarizing plates. The polarizing plates may include a polarizer and a protective film formed on the polarizer. The polarizing plates may further include a hard coating layer, an anti-reflective layer or the like.

The adhesive film may have a thickness of about 10 μm to about 2 mm, or, for example, about 50 μm to about 1.5 mm. Within these ranges, the adhesive film may be used for optical displays.

The adhesive film having a thickness of 100 μm may have a haze of about 3% or less, or, for example, about 2% or less, or, for example, about 1% or less, as measured after the adhesive film is subjected to 200% stretching. Within these ranges, the adhesive film may exhibit excellent transparency when used for displays.

The adhesive film may have an average slope of about −5 to about 0, or, for example, about −3 to about 0, or, for example, about −2 to about 0, or, for example, about −1 to about 0, as measured in the range of −20° C. to 80° C. in a graph depicting a temperature-dependent storage modulus distribution of the adhesive film where an x-axis represents temperature (° C.) and a y-axis represents storage modulus (kPa). Within these ranges, the adhesive film may exhibit viscoelasticity in a wide temperature range and an excellent recovery rate, and may be used in flexible optical members.

The term "average slope" refers to an average slope in the range of −20° C. to 80° C. in a graph depicting a temperature-dependent storage modulus distribution of the adhesive film where an x-axis represents temperature (° C.) and a y-axis represents storage modulus (kPa), and is calculated by Equation 2:

$$\text{Average slope} = (Mo(80°\ C.) - Mo(-20°\ C.))/(80-(-20)) \quad \text{[Equation 2]}$$

where Mo(80° C.) is a storage modulus at 80° C., and Mo(−20° C.) is a storage modulus at 20° C.).

The adhesive film may include the nanoparticles. Accordingly, the adhesive film may be flexible even at a low temperature (−20° C.), and may maintain storage modulus suitable for flexible devices. The adhesive film may exhibit excellent viscoelasticity at a low temperature (−20° C.) and/or room temperature (25° C.), and may exhibit stable viscoelasticity even at a high temperature (80° C.). The adhesive film including the nanoparticles may allow the nanoparticles to suppress coagulation between matrices as compared with the adhesive film including only the hydroxyl group-containing (meth)acrylic copolymer. Accordingly, the adhesive film may exhibit excellent wettability on an adherend. In addition, although the adhesive film includes the nanoparticles, there may be a specific difference in an index of refraction between the nanoparticles having a specific average particle diameter and the hydroxyl group-containing (meth)acrylic copolymer, whereby the adhesive film can have excellent transparency. The adhesive film may maintain viscoelasticity in a wide temperature range. Accordingly, the adhesive film may exhibit excellent foldability and may be used for flexible optical members.

The adhesive film may have a storage modulus at 80° C. of about 10 kPa, 20 kPa, 30 kPa, 40 kPa, 50 kPa, 60 kPa, 70 kPa, 80 kPa, 90 kPa, 100 kPa, 110 kPa, 120 kPa, 130 kPa, 140 kPa, 150 kPa, 160 kPa, 170 kPa, 180 kPa, 190 kPa, 200 kPa, 300 kPa, 400 kPa, 500 kPa, 600 kPa, 700 kPa, 800 kPa, 900 kPa, or 1000 kPa. The adhesive film may have a storage modulus at 80° C. ranging from one of the numerical values set forth above to another one of the numerical values set forth above. For example, the adhesive film may have a storage modulus at 80° C. of about 10 kPa to about 1,000 kPa. Within this range, the adhesive film may exhibit viscoelasticity even at high temperatures as well as an excellent recovery rate. The adhesive film may not be detachable from an adherend even when frequently folded at high temperature, and overflow of the adhesive film may be prevented. For example, the adhesive film may have a storage modulus at 80° C. of about 10 kPa to about 150 kPa, or, for example, about 10 kPa to about 100 kPa.

The adhesive film may have a storage modulus at 25° C. of about 10 kPa to about 1,000 kPa, or, for example, about 10 kPa to about 500 kPa, or, for example, about 15 kPa to about 150 kPa. Within these ranges, the adhesive film may exhibit viscoelasticity at room temperature and an excellent recovery rate.

The adhesive film may have a storage modulus at −20° C. of about 10 kPa to about 1,000 kPa, or, for example, about 10 kPa to about 500 kPa, or, for example, about 20 kPa to about 200 kPa. Within these ranges, the adhesive film may not suffer from whitening due to flexibility thereof when used for a flexible device at a low temperature. Accordingly, the adhesive film may be used for purposes of optical materials.

In addition, a ratio of storage modulus at 80° C. to storage modulus at −20° C. of the adhesive film may range from about 1:1 to about 1:10, or, for example, from about 1:1 to about 1:8, or, for example, from about 1:1 to about 1:6, or, for example, from about 1:1 to about 1:5. Within these ranges, the adhesive film may not suffer from deterioration in adhesion between adherends in a wide temperature range (−20° C. to 80° C.) and may be used for flexible optical members.

To improve the peel strength of the adhesive film, a surface onto which the adhesive composition is coated may be subjected to a surface treatment in advance, for example, a corona pretreatment at about 150 mJ/cm$^2$ or more. For example, when the surface onto which the adhesive composition is coated is subjected to a corona pretreatment, the adhesive film may exhibit a further improved T-peel strength at 25° C. and 60° C. For example, the corona pretreatment may be performed by treating a surface of an adherend (for example, a PET film) twice under a corona discharge at a dose of about 78 using a corona treatment device (Now Plasma Co., Ltd.).

The adhesive film may be such that at a thickness of 100 μm, the adhesive film may have a T-peel strength of about 400 gf/in, 450 gf/in, 500 gf/in, 550 gf/in, 600 gf/in, 650 gf/in, 700 gf/in, 750 gf/in, 800 gf/in, 850 gf/in, 900 gf/in, 950 gf/in, 1000 gf/in, 1100 gf/in, 1200 gf/in, 1300 gf/in, 1400 gf/in, 1500 gf/in. 1600 gf/in. 1700 gf/in, 1800 gf/in, 1900 gf/in, 2000 gf/in, 2100 gf/in, 2200 gf/in, 2300 gf/in. 2400 gf/in, 2500 gf/in, 2600 gf/in, 2700 gf/in, 2800 gf/in, 2900 gf/in, 3000 gf/in. 3100 gf/in. 3200 gf/in, 3300 gf/in, 3400 gf/in, 3500 gf/in, 3600 gf/in, 3700 gf/in, 3800 gf/in, 3900 gf/in, or 4000 gf/in, as measured at room temperature (25° C.) with respect to a corona-treated PET film. The adhesive film having a thickness of 100 μm may have a T-peel strength ranging from one of the numerical values set forth above to another one of the numerical values set forth above, as measured at room temperature (25° C.) with respect to a corona-treated PET film. For example, the adhesive film having a thickness of 100 μm may have a T-peel strength of about 400 gf/in to about 4,000 gf/in, or, for example, about 500 gf/in to about 3,700 gf/in, or, for example, about 700 gf/in to about 3,500 gf/in, as measured at room temperature (25° C.) with respect to a corona-treated PET film. Within these ranges, the adhesive film may exhibit excellent reliability and adhesion at room temperature.

The adhesive film may be such that at a thickness of 100 μm, the adhesive film may have a T-peel strength of about 200 gf/in, 250 gf/in, 300 gf/in, 350 gf/in, 400 gf/in, 450 gf/in, 500 gf/in, 550 gf/in, 600 gf/in, 650 gf/in, 700 gf/in, 750 gf/in, 800 gf/in, 850 gf/in, 900 gf/in, 950 gf/in, 1000 gf/in, 1100 gf/in, 1200 gf/in, 1300 gf/in, 1400 gf/in, 1500 gf/in, 1600 gf/in, 1700 gf/in, 1800 gf/in, 1900 gf/in, 2000 gf/in, 2100 gf/in, 2200 gf/in, 2300 gf/in, 2400 gf/in, 2500 gf/in, 2600 gf/in, 2700 gf/in, 2800 gf/in, 2900 gf/in, or 3000 gf/in, as measured at 60° C. with respect to a corona-treated PET film. The adhesive film having a thickness of 100 μm may have a T-peel strength ranging from one of the numerical values set forth above to another one of the numerical values set forth above, as measured at 60° C. with respect to a corona-treated PET film. For example, the adhesive film having a thickness of 100 μm may have a T-peel strength of about 200 gf/in to about 3,000 gf/in, or, for example, about 500 gf/in to about 2,000 gf/in, or, for example, about 500 gf/in to about 1,500 gf/in, as measured at 60° C. with respect to a corona-treated PET film. Within these ranges, the adhesive film may exhibit excellent adhesion and reliability even when having a curved shape at high temperature.

The T-peel strength of the adhesive film may be measured as follows. A specimen is prepared by laminating corona-pretreated surfaces of PET films having a size of about 150 mm×about 25 mm×about 75 μm (length×width×thickness) to both surfaces of the adhesive film having a size of about 100 mm×about 25 mm×about 100 (length×width×thickness). Next, the specimen is subjected to autoclaving under conditions of about 3.5 bar and about 50° C. for about 1,000 seconds and then secured to a TA.XT_Plus texture analyzer (Stable Micro System Co., Ltd.). At 25° C. or 60° C., the PET film at one side is kept fixed and the PET film at the other side is pulled at a rate of about 50 mm/min, thereby measuring T-peel strength of the adhesive film with respect to the PET film. Corona pretreatment of the PET film may be performed, for example, by treating the PET film twice (total dose: about 156) under corona discharge at a dose of about 78 using a corona treatment device (Now plasma Co., Ltd.).

The adhesive film may be such that at a thickness of 100 μm, the adhesive film may have a recovery rate of about 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%. 77%, 78%, 79%, 80%, 81%, 82%, 83%, 84%, 85%, 86%. 87%, 88%, 89%, 90%, 91%, 92%, 93%. 94%. 95%, 96%, 97%, or 98%, as calculated by Equation 1. The adhesive film having a thickness of 100 μm may have a recovery rate ranging from one of the numerical values set forth above to another one of the numerical values set forth above, as represented by Equation 1. For example, the adhesive film having a thickness of 100 μm may have a recovery rate of about 30% to about 98%, for example, about 40% to about 95%, as represented by Equation 1. Within these ranges, the adhesive film can be used for flexible optical displays, and has long lifespan even when frequently folded.

$$\text{Recovery rate (\%)} = (1-(X_f/X_0)) \times 100 \qquad \text{[Equation 1]}$$

where $X_0$ and $X_f$ are defined in the following Method A:

Method A: Determination of Recovery Rate

When both ends of a polyethylene terephthalate (PET) film having a size of about 50 mm×about 20 mm (length× width) are defined as a first end and a second end, respectively, a specimen is prepared by bonding ends of two PET films to each other via an adhesive film (length×width: about 20 mm×about 20 mm, thickness: about 75 μm) in order of first end of first PET film/adhesive film/second end of second PET film. Next, jigs are secured to non-bonded ends of the PET films of the specimen, respectively. Next, the jig at one side is kept fixed and the jig at the other side is pulled to a distance of about 1,000% of thickness (unit: μm) of the adhesive film (to a distance of about 10 times an initial thickness ($X_0$) of the adhesive film) at a rate of about 300 mm/min and then maintained for about 10 seconds. When a force of about 0 kPa is applied to the adhesive film by recovering the adhesive film at the same rate (about 300 mm/min) as the pulling rate, an increased length of the adhesive film is defined as Xf (unit: μm)

In addition, an adhesive film of each layer that is attached to an optical sheet in a display may have a different recovery rate.

In an implementation, the adhesive film having a thickness of 100 μm may have a recovery rate of about 60% to about 98%, for example, about 65% to about 95%. Within these ranges, the adhesive film may exhibit excellent reliability.

In another embodiment, the adhesive film having a thickness of 100 μm may have a recovery rate of about 30% to about 60%, for example, about 40% to about 70%. Within these ranges, the adhesive film may exhibit excellent flexibility.

The adhesive film (length×width×thickness: about 13 cm×about 3 cm×about 100 μm) may have a bubble generation area of about 0%, as measured after the adhesive film is subjected to aging at about 70° C. and about 93% RH for 24 hours. As such, the adhesive film may not suffer from detachment from an adherend even at high temperature and high humidity.

The term "bubble generation area" may refer to a value (%) measured through the following Method B.

Method B: Determination of Bubble Generation Area

An adhesive film (length×width×thickness: about 13 cm×about 3 cm×about 100 μm) including an about 50 μm thick PET film stacked on one surface thereof and an about 100 μm thick PET film stacked on the other surface thereof is bent towards the about 50 μm thick PET film such that the length of the adhesive film is halved, and is then placed between parallel frames having a gap of about 1 cm. Next, the adhesive film is subjected to aging at about 70° C. and about 93% RH for about 24 hours, followed by analyzing an image, which is obtained through observation of portions of the adhesive film suffering from bubbles using an optical microscope (EX-51, Olympus Co., Ltd., magnification: 30×), using Mac-View software (Mountech Co., Ltd.) to measure a ratio of area occupied by bubbles to area of the adhesive film.

Display Member

Embodiments further relate to a display member. Hereinafter, a display member including the adhesive film according to the embodiments will be described in detail with reference to the accompanying drawings.

The display member may include an optical film and the aforementioned adhesive film attached to one or both surfaces of the optical film.

FIG. 1 is a sectional view of a display member according to an embodiment.

Referring to FIG. 1, a display member may include an optical film 40 and an adhesive layer or an adhesive film formed on one surface of the optical film 40. Reference numeral 200 in FIG. 1 may represent the adhesive layer or the adhesive film.

In an embodiment, the display member may include the optical film 40 and an adhesive layer 200 formed on one or both surfaces of the optical film 40.

The adhesive layer may be formed of the adhesive composition as described herein. For example, the adhesive composition, which may be prepared by mixing and polymerizing a monomer mixture forming a hydroxyl group-containing (meth)acrylic copolymer, nanoparticles and a photopolymerization initiator, followed by adding an additional photopolymerization initiator to the polymer, may be coated onto the optical film 40, thereby forming the adhesive layer. The method may further include drying the adhesive layer.

In another embodiment, the display member may include the optical film 40 and the adhesive film 200, which may be formed on one or both surfaces of the optical film 40.

Examples of the optical film may include a touch panel, a window, a polarizing plate, a color filter, a retardation film, an elliptical polarizing film, a reflective film, an anti-reflective film, a compensation film, a brightness improving film, an alignment film, an optical diffusion film, a glass shatterproof film, a surface protective film, an OLED device barrier layer, a plastic LCD substrate, an indium tin oxide (ITO)-containing film, a fluorinated tin oxide (FTO)-containing film, an aluminum-doped zinc oxide (AZO)-containing film, an Ag nanowire-containing film, a graphene-containing film, or the like. The optical film may be easily manufactured.

For example, a touch panel may be attached to a window or an optical film via the adhesive film, thereby forming a display member. According to an implementation, the adhesive film may be applied to general polarizing plates. For example, a display may include a capacitive mobile phone as an optical display.

In an implementation, the display member may be a display member in which a first adhesive film, a touch functional unit, a second adhesive film and a window film are sequentially stacked on an optical device.

The optical device may include an OLED, an LED or a light source. The first or second adhesive film may be the adhesive film described herein. The touch functional unit may be a touch panel, as an example.

The window film may be formed of an optically transparent flexible resin. For example, the window film may include a base layer and a hard coating layer.

The base layer may be formed of at least one a polyester resin such as polyethylene terephthalate, polyethylene naphthalate, polybutylene terephthalate and polybutylene naphthalate; a polycarbonate resin; a polyimide resin; a polystyrene resin; or a poly(meth)acrylate resin such as polymethyl methacrylate.

The hard coating layer may have a pencil hardness of about 6H or higher and may be formed of, for example, a siloxane resin.

In another embodiment, the display member may include: a liquid crystal panel in which a polarizer is stacked on both surfaces of an LCD cell; a double-sided adhesive tape (DAT) bonding functional films (for example, anti-reflective films) to each other; and a touch panel unit formed on the functional films. The touch panel unit may include: a first adhesive film; a first transparent electrode film stacked on the first adhesive film; a second adhesive film; and a second transparent electrode film. An electrode and an overcoating layer for the electrode may be formed on the second transparent electrode film, and a third adhesive film and a window glass may be stacked on the overcoating layer in order. An air gap may be removed upon lamination.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLE (A) Monomer Mixture
(a1) 2-ethylhexyl acrylate (EHA) was used.
(a2) 4-hydroxybutyl acrylate (HBA) was used.
(a3) Isobornyl acrylate (IBOA) was used.
(B) Nanoparticles
(b1) Nanoparticles that had a core-shell structure composed of a core of polybutyl acrylate (PBA) and a shell of polymethylmethacrylate (PMMA), and had a weight ratio of the core to the shell of 1.5:1, an average particle diameter (D50) of 230 nm and an index of refraction ($N_B$) of 1.48, were used.

(b2) 99.5 g of a dimethylsiloxane-diphenylsiloxane cross-linked copolymer that had an index of refraction of 1.43 and an average particle diameter of 170 nm and included 41 wt % of toluene insolubles, 127.2 g of n-butyl acrylate, and 2.4 g of triallyl isocyanurate were mixed at room temperature, followed by preparing a silicone mixture in which 1.4 g of sodium dodecylbenzenesulfate was dispersed in 760 g of deionized water. 2.4 g of potassium sulfate was introduced to the liquid mixture while the liquid mixture was maintained at 75° C., thereby performing polymerization for 4 hours. Next, 0.7 g of potassium sulfate was additionally introduced to the liquid mixture, followed by performing dropwise addition of a solution, in which 64.8 g of methyl methacrylate and 7.25 g of methyl acrylate were mixed, to the liquid mixture for 15 minutes. Next, the components were reacted at 75° C. for 4 hours and then cooled to room temperature (reaction conversion: 97.4%). The final reaction solution and an aqueous solution of 1.5% $MgSO_4$ were mixed at 75° C., followed by washing and drying, thereby preparing nanoparticles and confirming the presence thereof. The prepared nanoparticles had an index of refraction ($N_B$) of 1.45, an average particle diameter of 173 nm, and a weight ratio of core to shell of 2.36:1.

(b3) Nanoparticles that had a core-shell structure composed of a core of polydimethylsiloxane (PDMS) and a shell of polymethylmethacrylate (PMMA), and had a weight ratio of the core to the shell of 3:1, an average particle diameter of 265 nm and an index of refraction ($N_B$) of 1.39, were used.

(C) Initiator (c1) Irgacure 651 (2,2-dimethoxy-2-phenylacetophenone, BASF Co., Ltd.) was used as a radical photopolymerization initiator.

(c2) Irgacure 184 (1-hydroxycyclohexyl phenyl ketone, BASF Co., Ltd.) was used as a radical photopolymerization initiator.

(D) Crosslinking agent: 1,6-hexanediol diacrylate (HDDA, SK Cytec Co., Ltd.) was used.

(E) Coupling agent: 3-glycidoxypropylmethyldiethoxysilane (KBM-403, Shin-Etsu Chemical Co., Ltd.) was used.

Example 1

2 parts by weight of (b1) nanoparticles and 0.005 parts by weight of (c1) a photopolymerization initiator (Irgacure 651) were sufficiently mixed with 100 parts by weight of a monomer mixture, which included 75 wt % of (a1) 2-ethylhexyl acrylate and 25 wt % of (a2) 4-hydroxybutyl acrylate, in a glass container. Dissolved oxygen in the glass container was purged using nitrogen gas, followed by polymerizing the mixture through UV irradiation using a low-pressure lamp (BL lamp, Samkyo Co., Ltd., 50 mW/cm², wavelength: 350 nm), thereby obtaining a syrup comprising a partially polymerized hydroxyl group-containing (meth)acrylic copolymer, nanoparticles. and a not-polymerized monomer mixture. 0.35 parts by weight of an additional photopolymerization initiator (Irgacure 184) (c2) and 0.05 parts by weight of HDDA as a crosslinking agent (D) were added to the syrup, thereby preparing an adhesive composition. (viscosity: about 3,000 cPs)

The prepared adhesive composition was coated onto a polyester film (release film, polyethylene terephthalate film, thickness: 50 μm), thereby forming a 100 μm thick adhesive film. An upper side of the adhesive film was covered with a 75 μm thick release film, followed by irradiating both surfaces of the adhesive film with light for about 6 minutes using a low-pressure lamp (BL lamp, Samkyo Co., Ltd., 50 mW/cm², wavelength: 350 nm), thereby obtaining an adhesive film. The adhesive film had an index of refraction of 1.47 and a glass transition temperature (Tg) of −42° C.

Examples 2 to 6 and Comparative Examples 1 to 2

A transparent adhesive sheet was manufactured in the same manner as in Example 1 except that an amount of each of the components in Example 1 was modified as listed in Table 1.

The transparent adhesive sheets prepared in Examples and Comparative Examples were evaluated as to the properties as listed in Table 1. Results are shown in Table 1.

Evaluation of Properties (1) Glass transition temperature (Tg, ° C.): A 15 mg (on 6 mm Al Pan) specimen was prepared from each of the adhesive films of Examples and the Comparative Examples. The specimen was heated to 180° C. at a heating rate of 20° C./min in a nitrogen atmosphere (50 mL/min), followed by cooling to −100° C. (first heating condition (1st run)). Next, while the specimen was heated to 100° C. at a heating rate of 10° C./min, a glass transition temperature (Tg) of the specimen was measured.

(2) Storage modulus: Viscoelasticity was measured at a shear rate of 1 rad/sec at a strain of 1% under auto strain conditions using ARES (MCR-501, Anton Paar Co., Ltd.) which was a dynamic viscoelasticity instrument. After removal of a release film, the manufactured adhesive sheet was stacked to a thickness of 500 μm. Next, the stacked body was subjected to punching using an 8 mm diameter puncher, thereby preparing a specimen. Storage modulus was measured on the specimen at a temperature of −60° C. to 90° C. at a heating rate of 5° C./min, and storage modulus at each of −20° C., 25° C. and 80° C. was recorded.

(3) Average slope: When a temperature-dependent storage modulus distribution of the adhesive film was plotted in a graph where an x-axis represents temperature (° C.) and a y-axis represents storage modulus (kPa), an average slope in a range of −20° C. to 80° C. was calculated by Equation 2:

$$\text{Average slope} = (Mo(80° \text{C.}) - Mo(-20° \text{C.}))/(80-(-20)) \quad \text{[Equation 2]}$$

where Mo(80° C.) is a storage modulus at 80° C., and Mo(−20° C.) is a storage modulus at −20° C.).

(4) T-peel strength: A PET film having a size of 150 mm×25 mm×75 μm (length×width×thickness) was subjected to corona treatment twice (total dose: 156) under corona discharge at a dose of 78 using a corona treatment device. An adhesive film sample having a size of 100 mm×25 mm×100 μm (length×width×thickness) was obtained from each of the adhesive sheets of Examples and Comparative Examples. Corona-treated surfaces of the PET films were laminated to both surfaces of the adhesive film sample, thereby preparing a specimen as shown in FIG. 2(a). The specimen was subjected to autoclaving at a pressure of 3.5 bar at 50° C. for 1,000 seconds and secured to a TA.XT_Plus texture analyzer (Stable Micro System Co., Ltd.). Referring to FIG. 2(b), the PET film at one side was kept fixed and the PET film at the other side was pulled at a rate of 50 mm/min at 25° C. using a TA.XT_Plus texture analyzer, thereby measuring T-peel strength at 25° C. (see FIG. 2(b)).

In addition, the PET film at one side was kept fixed and the PET film at the other side was pulled at a rate of 50 mm/min at 60° C. using a TA.XT_Plus texture analyzer, thereby measuring T-peel strength at 60° C.

(5) Haze: A haze meter (NDH 5000, Nippon Denshoku Co., Ltd.) was used. Haze was measured on a specimen having a thickness of 100 μm in accordance with American Society for Testing and Measurement (ASTM) D1003-95 (Standard Test for Haze and Luminous Transmittance of Transparent Plastic).

(6) Haze after 200% stretching: Both ends of a sample (13 cm×3 cm, thickness: 100 μm) of the manufactured adhesive film were secured to both sides of a horizontal tensile tester, followed by removing release films from both surfaces of the sample. After the sample was subjected to 200% stretching in a longitudinal direction, a glass plate was placed on a lower side of the sample and a release film was placed on an upper side of the sample, followed by bonding the sample to the glass plate through 2 kg rollers, thereby preparing a stretched specimen. Next, the release film was removed from the upper side, followed by measuring haze in the same manner as described above.

(7) Recovery rate: Recovery rate was measured through the following procedures. When both ends of each polyethylene terephthalate (PET) film (thickness: 75 μm) having a size of 50 mm×20 mm (length×width) were defined as a first end and a second end, respectively, a specimen was prepared by bonding ends of two PET films to each other via the adhesive film having a size of 20 mm×20 mm (length× width) in order of first end of first PET film/adhesive film/second end of second PET film, and had a contact area of 20 mm×20 mm (length×width) between each of the PET films and the adhesive film (see FIGS. 3(a) and 3(b)). Referring to FIG. 3(a), jigs were secured to non-bonded ends of the PET films of the specimen at room temperature (25° C.), respectively. Next, the jig at one side was kept fixed, and the jig at the other side was pulled to a length of 1,000% of thickness (unit: vim) of the adhesive film (to a length of 10 times an initial thickness ($X_0$) of the adhesive film) at a rate of 300 mm/min and then maintained for 10 seconds. Next, when an increased length of the adhesive film was defined as $X_f$ (unit: vim) when a force of 0 kPa was applied to the adhesive film by recovering the adhesive film at the same rate (300 mm/min) as the pulling rate, recovery rate (%) was calculated by Equation 1:

$$\text{Recovery rate (\%)} = (1-(X_f/X_0)) \times 100. \quad [\text{Equation 1}]$$

(8) Bubble generation area (%): An adhesive film (length× width×thickness: 13 cm×3 cm×100 vim) including a 50 μm thick PET film stacked on one surface thereof and a 100 μm thick PET film stacked on the other surface thereof was bent towards the 50 vim thick PET film such that the length of the adhesive film was halved, and then placed between parallel frames having a gap of 1 cm. Next, the adhesive film was subjected to aging under conditions of 70° C. and 93% RH for 24 hours, followed by analyzing an image, which was obtained through an optical microscope (EX-51, Olympus Co., Ltd.), using Mac-View software (Mountech Co., Ltd.) to calculate a ratio of area occupied by bubbles to area of the adhesive film.

(9) Index of refraction: Index of refraction was measured using a multi-wavelength Abbe refractometer (DR-M2, ATAGO Co., Ltd.).

TABLE 1

| | | Example | | | | | | Comparative Example | |
|---|---|---|---|---|---|---|---|---|---|
| | | 1 | 2 | 3 | 4 | 5 | 6 | 1 | 2 |
| (A) | (a1) | 75 | 75 | 75 | 80 | 60 | 60 | 80 | — |
| | (a2) | 25 | 25 | 25 | 20 | 40 | 40 | 20 | 40 |
| | (a3) | — | — | — | — | — | — | — | 60 |
| (B) | (b1) | 2 | 4 | 8 | 4 | — | — | — | 4 |
| | (b2) | — | — | — | — | 2.5 | 10 | — | — |
| | (b3) | — | — | — | — | — | — | 4 | — |
| (C) | (c1) | 0.005 | 0.005 | 0.005 | 0.005 | 0.005 | 0.005 | 0.005 | 0.005 |
| | (c2) | 0.35 | 0.35 | 0.35 | 0.35 | 0.35 | 0.35 | 0.35 | 0.35 |
| (D) | | 0.05 | 0.05 | 0.05 | 0.05 | — | — | 0.05 | 0.05 |
| (E) | | — | — | — | — | 0.1 | 0.1 | — | — |
| $N_A$ | | 1.47 | 1.47 | 1.47 | 1.48 | 1.44 | 1.44 | 1.48 | 1.47 |
| $|N_A - N_B|$ | | 0.01 | 0.01 | 0.01 | 0 | 0.01 | 0.01 | 0.09 | 0.01 |
| Tg of adhesive film (° C.) | | −42 | −42 | −41 | −45 | −36.8 | −39.8 | −43 | 23 |
| Index of refraction of adhesive film | | 1.47 | 1.47 | 1.47 | 1.48 | 1.44 | 1.44 | 1.48 | 1.47 |
| Storage modulus (kPa) −20° C. | | 75 | 80 | 150 | 61 | 129 | 211 | 72 | 220 |
| 25° C. | | 33 | 38 | 52 | 28 | 42 | 66 | 35 | 72 |
| 80° C. | | 21 | 23 | 25 | 18 | 32 | 57 | 21 | 78 |
| Average slope | | −0.54 | −0.57 | −1.25 | −0.43 | −0.97 | −1.54 | −0.51 | −1.42 |
| T-peel strength 25° C. | | 1090 | 1112 | 1386 | 1257 | 692 | 1067 | 331 | 294 |
| (gf/in) 60° C. | | 681 | 696 | 784 | 703 | 382 | 731 | 295 | 229 |
| Haze (%) | | 0.48 | 0.89 | 1.21 | 0.44 | 0.95 | 1.12 | 6.25 | 0.92 |
| Haze after 200% stretching (%) | | 0.51 | 0.99 | 1.35 | 0.45 | 1.08 | 1.28 | 6.99 | 1.23 |
| Recovery rate (%) | | 85 | 84 | 86 | 49.1 | 47.1 | 78.2 | 62 | 98 |
| Bubble generation area (%) | | 0 | 0 | 0 | 0 | 0 | 0 | 0 | 0 |

In Table 1, $N_A$ is an index of refraction of a hydroxyl group-containing (meth)acrylic copolymer; $N_B$ is an index of refraction of nanoparticles; $|N_A-N_B|$ is a difference in index of refraction between the nanoparticles and the hydroxyl group-containing (meth)acrylic copolymer; and Tg of an adhesive film is a glass transition temperature (Tg) of an adhesive composition after curing.

As shown in Table 1, it could be seen that the adhesive films of Examples 1 to 6 did not suffer from bubble generation even under severe conditions and thus could maintain viscoelasticity in a wide temperature range, exhibited excellent properties in terms of recovery rate, adhesion and reliability, and had low haze (transparency).

On the other hand, the adhesive films of Comparative Examples 1 to 2 exhibited unsatisfactory properties in terms of at least one of transparency, haze, or the like.

By way of summation and review, a transparent adhesive film may improve clarity of a screen as compared with an existing double-sided tape and may exhibit good adhesion while by transmitting 97% or more of light. A transparent adhesive film may be used for tablet PCs, TVs or the like including a middle or large-sized display screen as well as for mobile phones.

Recently, various other properties have become desirable for a transparent adhesive film due to severer environments of using, storing and/or manufacturing optical displays and an increasing interest in flexible optical displays or the like. For example, for application to flexible displays, it is desirable that a transparent adhesive film maintain viscoelasticity in a wide temperature range and also exhibit excellent recoverability.

Embodiments provide an adhesive film that exhibits excellent recoverability, transparency and reliability under severe conditions while maintaining viscoelasticity in a wide temperature range, and a display member including the adhesive film.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. An adhesive film including a hydroxyl group-containing (meth)acrylic copolymer, the adhesive film being formed from an adhesive composition, the adhesive composition comprising:
a monomer mixture including a hydroxyl group-containing (meth)acrylate and a comonomer, the monomer mixture from which the hydroxyl group-containing (meth)acrylic copolymer is polymerized including about 5 wt % to about 40 wt % of the hydroxyl group-containing (meth)acrylate and about 60 wt % to about 95 wt % of the comonomer; and
nanoparticles,
wherein:
the adhesive film has a glass transition temperature (Tg) of about −100° C. to about −30° C., an index of refraction of about 1.40 to about 1.55, and a haze of about 3% or less at a thickness of 100 μm,
the adhesive film has a storage modulus at 80° C. of about 10 kPa to about 200 kPa, and
the adhesive film has a storage modulus at −20° C. of about 10 kPa to about 1000 kPa.

2. The adhesive film as claimed in claim 1, wherein the hydroxyl group-containing (meth)acrylate has a glass transition temperature (Tg) of about −80° C. to about −20° C.

3. The adhesive film as claimed in claim 1, wherein the nanoparticles have an average particle diameter of about 5 nm to about 400 nm.

4. The adhesive film as claimed in claim 1, wherein the nanoparticles are present in an amount of about 0.1 parts by weight to about 20 parts by weight based on 100 parts by weight of the monomer mixture.

5. The adhesive film as claimed in claim 1, wherein the adhesive composition further includes at least one of an initiator and a crosslinking agent.

6. The adhesive film as claimed in claim 1, wherein the adhesive film has a property such that at a thickness of 100 μm, the adhesive film has a haze of about 3% or less, as measured after the adhesive film is subjected to 200% stretching.

7. The adhesive film as claimed in claim 1, wherein the adhesive film has an average slope of about −5 to about 0, as measured in the range of −20° C. to 80° C. in a graph depicting a temperature-dependent storage modulus distribution of the adhesive film where an x-axis represents temperature (° C.) and a y-axis represents storage modulus (kPa).

8. The adhesive film as claimed in claim 1, wherein the adhesive film has a T-peel strength with respect to a corona-treated polyethylene terephthalate (PET) film of about 400 gf/in to about 4,000 gf/in, as measured at 25° C.

9. The adhesive film as claimed in claim 1, wherein the adhesive film has a T-peel strength with respect to a corona-treated polyethylene terephthalate (PET) film of about 200 gf/in to about 3,000 gf/in, as measured at 60° C.

10. The adhesive film as claimed in claim 1, wherein the adhesive film has a property such that at a thickness of 100 μm, the adhesive film has a recovery rate of about 30% to about 98%, as calculated by Equation 1:

$$\text{Recovery rate } (\%) = (1-(X_f/X_0)) \times 100 \quad \text{[Equation 1]}$$

where $X_0$ is an initial thickness of the adhesive film and $X_f$ is determined by a method including:
preparing a specimen by bonding ends of two polyethylene terephthalate (PET) films, each having a size of about 50 mm×about 20 mm (length×width) to each other via a test sample of the adhesive film having a size of about 20 mm× about 20 mm (length×width) in order of first end of first PET film/adhesive film/second end of second PET film, the adhesive film having a contact area of about 20 mm×about 20 mm (length×width) between each of the PET films and the adhesive film,
securing jigs to non-bonded ends of the PET films of the specimen at room temperature (25° C.), respectively,
fixing one of the jigs at the non-bonded end of the first PET film,
pulling another one of the jigs at a non-bonded end of the second PET film to a distance of about 1,000% of the initial thickness ($X_0$) of the adhesive film) at a rate of about 300 mm/min,
maintaining the adhesive film in the pulled state for about 10 seconds,
applying a force of about 0 kPa to the adhesive film to recover the adhesive film at a same rate as the pulling rate, an increased length of the adhesive film being defined as $X_f$ (unit: μm).

11. The adhesive film as claimed in claim 1, wherein the adhesive film has a bubble generation area of about 0%, the bubble generation area being determined by:
stacking a first PET film having a thickness of about 50 μm on one surface of a test sample of the adhesive film having length×width×thickness of about 13 cm×about 3 cm×about 100 μm and stacking a second PET film having a thickness of about 100 μm on an opposite surface of the adhesive film, bending the stacked PET film towards the first PET film having a thickness of about 50 μm such that the length of the adhesive film is halved, placing the bent first PET film, adhesive film, and second PET film between parallel frames having a gap of about 1 cm, subjecting the adhesive film to aging at about 70° C. and about 93% RH for about 24 hours, analyzing an image obtained through observation of portions of the adhesive film having bubbles to determine a ratio of area occupied by bubbles to area of the adhesive film.

12. The adhesive film as claimed in claim 1, wherein the adhesive film has a thickness of about 10 μm to about 2 mm.

* * * * *